(No Model.)
W. BELL.
RAILWAY GATE AND MEANS FOR PREVENTING INJURY TO STOCK ON RAILWAYS.
No. 314,990. Patented Apr. 7, 1885.
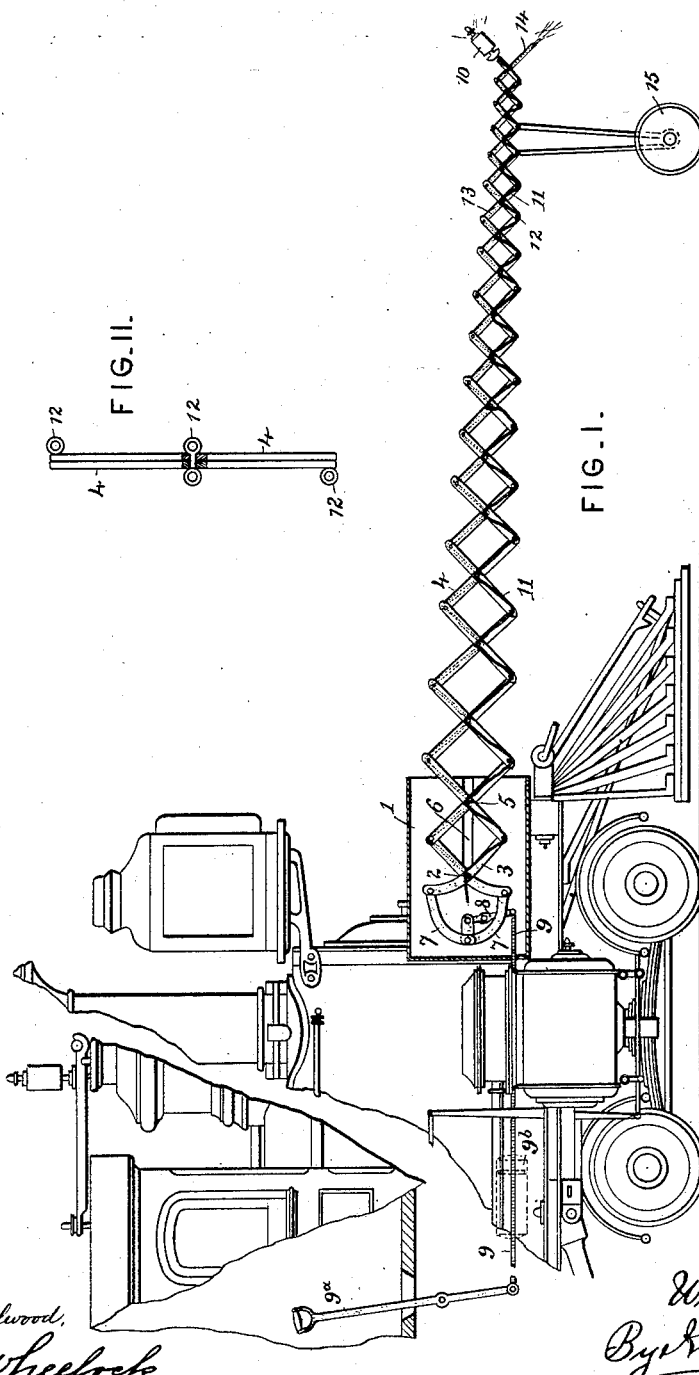

United States Patent Office.

WILLIAM BELL, OF VERONA, MISSISSIPPI, ASSIGNOR OF ONE-HALF TO LE VERT KIMBALL, OF SAME PLACE.

RAILWAY-GATE AND MEANS FOR PREVENTING INJURY TO STOCK ON RAILWAYS.

SPECIFICATION forming part of Letters Patent No. 314,990, dated April 7, 1885.

Application filed October 11, 1884. (No model.)

*To all whom it may concern:*

Be it known that I, WILLIAM BELL, a citizen of the United States, residing at Verona, in the county of Lee and State of Mississippi, have invented certain new and useful Improvements in Railway-Gates and in Means for Preventing Injury to Stock on Railways, of which the following is a specification.

The invention relates to lazy-tongs attached to the forward end of the engine adapted to be operated by the engineer when the train is approaching a roadway and supporting flexible tubes having at their ends, respectively, a whistle and a discharge-nozzle through which steam or water is projected onto any animal on the track.

The specific manner in which this invention is carried out will be described with reference to the accompanying drawings, in which—

Figure 1 represents in side elevation a locomotive to which my improvement has been applied; and Fig. 2, a transverse section of the lazy-tongs attachment.

1 is a frame mounted, preferably, on the forward truck of the engine having a stud or pin, 2, on which are pivoted the levers 3 of the lazy-tongs 4. A pin, 5, at the first joint of the lazy-tongs occupies a slot or groove, 6, in the frame, and thus guides the said tongs in their direct forward horizontal movement. The links 7 of the tongs are operated through the medium of rocking-lever 8 by a rod or cord, 9, actuated by a lever, 9$^a$, from the engineer's cab, or by means of hot-air or steam cylinder 9$^b$.

Strength and lightness of the tongs are secured by making the same gradually tapering toward their forward end.

When the engine is approaching a railway-crossing, the extension of the tongs some distance in front of the engine serves to prevent the entrance of any person or animal upon the track.

For the purpose of frightening animals from the track I employ a steam-whistle, 10, mounted upon the forward end of the lazy-tongs 4, and having flexible tube-connection 11 with the steam-supply pipe. The flexible tube 11 is mounted on screw-eyes 12, which form the pivots at the various joints of the tongs. A second flexible tube, 13, of rubber or gum (shown in dotted lines) is also mounted upon the lazy-tongs and carries at its forward end a spray-nozzle, 14, which is turned toward the center of the track, so as to enable water or steam to be projected onto any animal which may be thereon. If the engine is moving at greater speed than the animal, the lazy-tongs will gradually be contracted, so as to keep the spray constantly playing upon the animal.

In order to support the front end of the extensible arm and at the same time force the same to follow a curve in the rail, a wheel, 15, is employed having flanges engaging with each side of the rail.

Having thus described my invention, the following is what I claim as new therein and desire to secure by Letters Patent:

1. In combination with a locomotive-engine, a lazy-tongs attachment having means of operation from the cab and capable of being extended to a distance in front of the engine, substantially as and for the purpose set forth.

2. In combination with a grooved or slotted frame mounted on the forward engine-truck, a lazy-tongs having a pin projecting into said groove, and means of operating said tongs from the cab, as shown.

3. In combination with an extensible arm or attachment to the forward end of the engine, a whistle mounted on said arm, and flexible tube-connection with said whistle, substantially as set forth.

4. In combination with an extensible arm or attachment to the forward end of an engine, a nozzle mounted on the forward end of the same and having flexible tube-connection with the engine, substantially as shown.

5. An extensible arm supported on the forward truck of an engine and having a flanged wheel at its forward end, for the purpose set forth.

WILLIAM BELL.

Witnesses:
L. KIMBALL,
Z. T. KIRBY.